UNITED STATES PATENT OFFICE.

SIMON KRAFFT, OF MUNICH, GERMANY.

PROCESS OF MAKING PREVENTIVE AND CURATIVE LYMPH.

941,423.  Specification of Letters Patent. Patented Nov. 30, 1909.

No Drawing.  Application filed June 22, 1908. Serial No. 439,841.

*To all whom it may concern:*

Be it known that I, SIMON KRAFFT, doctor of philosophy, a subject of the Emperor of Germany, residing at 10 Schuberstrasse, Munich, Kingdom of Bavaria, German Empire, have invented certain new and useful Improvements in Processes for the Manufacture of Lymphs for Preventive and Curative Purposes, of which the following is a specification.

The present invention consists of a new process for the manufacture of lymphs, and is based on the utilization of the growth-preventing action of the metals on the bacteria which cause the disease which it is desired to treat.

The object of the invention is the production of a lymph which is equally efficacious and successful for preventing the spread of certain diseases as well as for curing subjects afflicted with the disease.

While my process may be applied to any bacteria culture for the production of a lymph for treating the disease caused by the corresponding bacteria, my invention is particularly apt for obtaining curative and preventive means against hemorrhagic septicemia, swine plague, and hog cholera.

Hitherto, in attempting to cure animals afflicted with swine plague and hog-cholera and to prevent the spread of such contagious diseases, cultures from diseased animals have repeatedly been employed, but with the attainment of but little or no success. According to the present process for obtaining lymphs for curative and preventive purposes, firstly, a culture of bacteria is obtained by allowing a species of bacteria to develop in a suitable nutritive medium, then a heavy metal, or a mixture of several metals, is added, and the metal or metals allowed to act a certain time, depending on the disease to be treated and its corresponding bacteria. The temperature most suitable for the action corresponds with the temperature which is the most favorable for the development and growing of the bacteria. The inventor has made the discovery that certain metals have on living bacteria a certain influence, with the practical result of imparting to the bacteria product a curative or immunizing power, whereas without such treatment the bacteria could act only injuriously. He has found that the beneficial result lies in the fact that by the treatment with metals a peculiar change has been effected in the bacteria cells. The length of time necessary in the practice of the process for the metals to act on any bacteria group may be fixed by means of experiments on animals which would be injured by the untreated or unchanged bacteria. The heavy metals are, in general, suitable for the present process, but preferably, metals are employed the soluble compounds of which have no injurious action on the subject which it is desired to treat with the lymph. In accordance with the process forming the present invention, a lymph is manufactured by the action of a heavy metal, such as zinc, on cultures of highly virulent swine-plague and hog-cholera bacteria, which lymph, when subcutaneously injected in quantities varying from 5 to 25 cubic centimeters, according to the size of the animal, cures fever-infected swine. The product is equally efficacious as a preventive lymph.

The following is a specific example of the manner in which this lymph may be obtained. A culture of virulent swine plague or hog cholera bacteria is obtained by introducing the bacteria of these groups into 500 cubic centimeters of culture bouillon, which is preferably the so-called nutritive gelatin, and allowing the same to act for two days in a suitable incubating vessel at a temperature of 25° C. The swine plague or hog cholera culture is then mixed with 7.5 grams of coarsely cut, chemically pure zinc, which has been previously subjected to dry sterilization for about fifteen minutes, and the mixture is placed in the incubating vessel. Here it is maintained at a temperature of 22° C. for a period of 15 hours while using the agitating mechanism. Then 25 grams of glycerin as pure as possible, and 2 grams of chemically pure carbolic acid are added, after which the liquid is allowed to settle somewhat and is filtered. It is to be understood that the carbolic acid has no curative power whatever in the present case, but is added only for the purpose of preventing decomposition of the lymph during a long storage. If it is desired to use the lymph soon, or immediately after its preparation, the addition of carbolic acid may be omitted, if desired.

The quantitative proportions vary according to the conditions. Generally speaking 7.5 grams of zinc or copper are used, 10 110 grams of tin and 5.5 grams of silver, in 500 cubic centimeters of bacteria culture liquid, but larger and smaller quantities can be used, however. The metals are preferably used in the form of powder, or small pieces.

Having thus described my invention, what I claim is:—

1. The herein described process for the manufacture of lymphs for preventive and curative purposes, which consists in preparing a culture of a bacteria group, adding thereto a metal and after the reaction is complete, separating the metal from the resulting product, thereby obtaining the curative lymph.

2. The herein described process for the manufacture of lymphs for preventive and curative purposes, which consists in preparing a culture of bacteria of the swine-plague and hog-cholera group, adding thereto a heavy metal the soluble compounds of which do not injure the animal organism, and after the reaction is complete, separating the metal from the resulting product, thereby obtaining the curative lymph.

3. The herein described process for the manufacture of lymphs for preventive and curative purposes, which consists in preparing a culture in nutritive gelatin of bacteria of the hog-cholera or swine-plague group, adding thereto a heavy metal, allowing the mixture to act for about fifteen hours in an incubating vessel, allowing to settle and separating the metal from the resulting product, thereby obtaining the curative lymph, substantially as described.

4. The herein described process for the production of lymphs for preventive and curative purposes, which consists in adding bacteria of the swine plague or hog cholera group, to nutritive gelatin, allowing the mixture to act for two days at a temperature of about 25° C., adding thereto pure zinc in a suitable state of division, allowing the mixture to act for 15 hours at a temperature of about 22° C., meanwhile agitating the mixture, then adding glycerin and carbolic acid to the mixture, allowing the liquid to settle, and then finally filtering the liquid, the metal being separated from the culture liquid thereby obtaining the curative lymph, substantially as described.

In witness whereof I have hereunto set my hand in presence of two witnesses.

SIMON KRAFFT.

Witnesses:
LOUIS F. MUELLER,
MATHILDE K. HELD.